Aug. 20, 1929.  A. C. SWEENY  1,725,111
OIL VAPORIZER
Filed Aug. 9, 1926   2 Sheets-Sheet 1

INVENTOR
Arthur C. Sweeny.
BY
ATTORNEY

Aug. 20, 1929.   A. C. SWEENY   1,725,111
OIL VAPORIZER
Filed Aug. 9, 1926   2 Sheets-Sheet 2
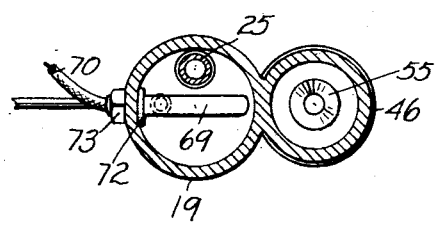
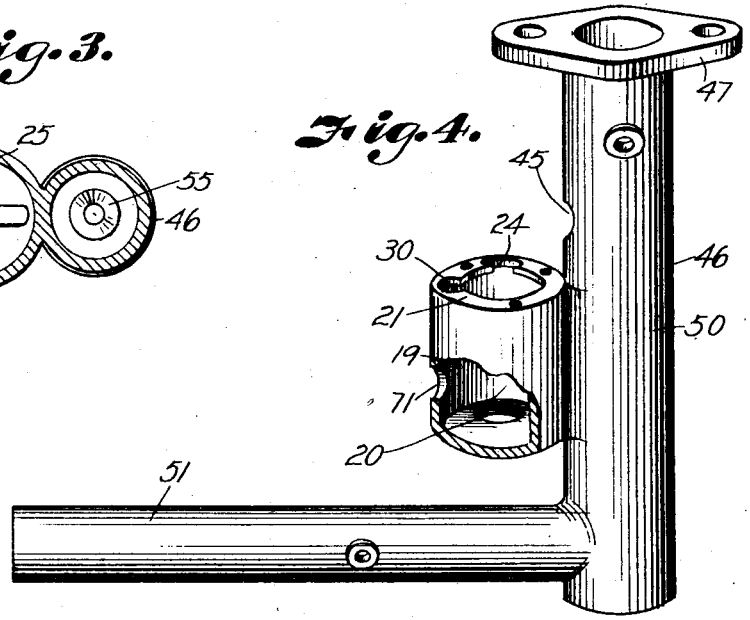
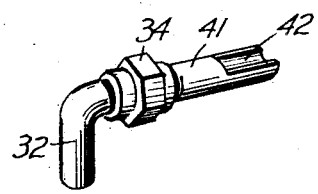
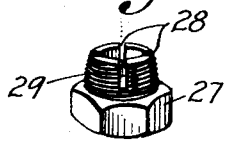
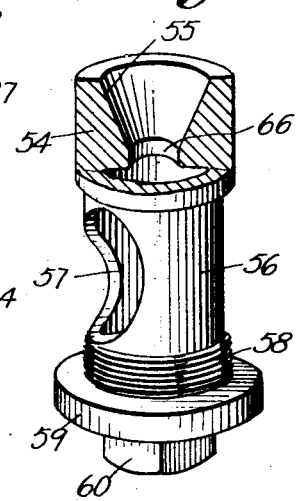
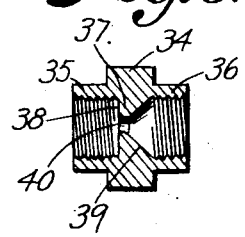
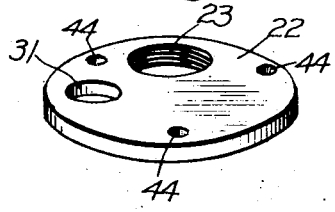
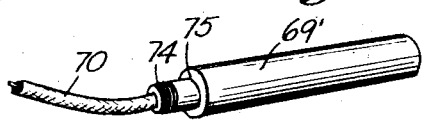
INVENTOR
Arthur C. Sweeny.
BY Arthur C. Brown
ATTORNEY Patented Aug. 20, 1929.

1,725,111

UNITED STATES PATENT OFFICE.

ARTHUR C. SWEENY, OF TULSA, OKLAHOMA.

OIL VAPORIZER.

Application filed August 9, 1926. Serial No. 128,097.

My invention relates to oil vaporizers and more particularly to an oil vaporizer in which liquid fuel is vaporized by the action of heat.

It is a purpose of my invention to provide an oil vaporizer comprising a liquid receptacle and heating means for the liquid in the receptacle whereby said liquid is vaporized, and furthermore to provide means for mixing air with the oil vapor in the proper proportions comprising an air inlet connection into which a conduit extends from the liquid receptacle. Preferably the air inlet connection is provided with a Venturi nozzle as is also the conduit leading into the same.

It is a further purpose of my invention to provide means for supplying an explosive mixture to an internal combustion engine comprising a liquid fuel receptacle in which the fuel is vaporized due to the action of heat and the vaporized fuel is supplied to an inlet leading to the intake manifold which is provided with an intake open to the outer air and which is provided with a valve regulating the effective opening in the inlet passage which is so located that the same does not vary the proportions of the air and vaporized fuel in the explosive mixture.

It is a further purpose of my invention to provide for heating the oil that is to be vaporized by means of the heat of the engine obtained from the exhaust gases and to provide means for heating said oil independent of said exhaust gases prior to and during starting of the engine, comprising an electric heating device extending into the oil receptacle.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 3 is a section taken on the line 3—3 of Fig. 2.

Fig. 4 is a perspective view partly broken away of the oil vaporizer, showing the cover and pipe connections removed.

Fig. 5 is a perspective view of the vapor inlet tube.

Fig. 6 is a perspective view of the bushing provided between the liquid receptacle and the heating tube.

Fig. 7 is a view partly in perspective and partly in section of a nozzle member provided in the air inlet.

Fig. 8 is a transverse sectional view of the nozzle provided in the vapor conduit.

Fig. 9 is a perspective view of the cover member for the liquid receptacle, and

Fig. 10 is a perspective view of the electric heating device detached.

Figure 1:
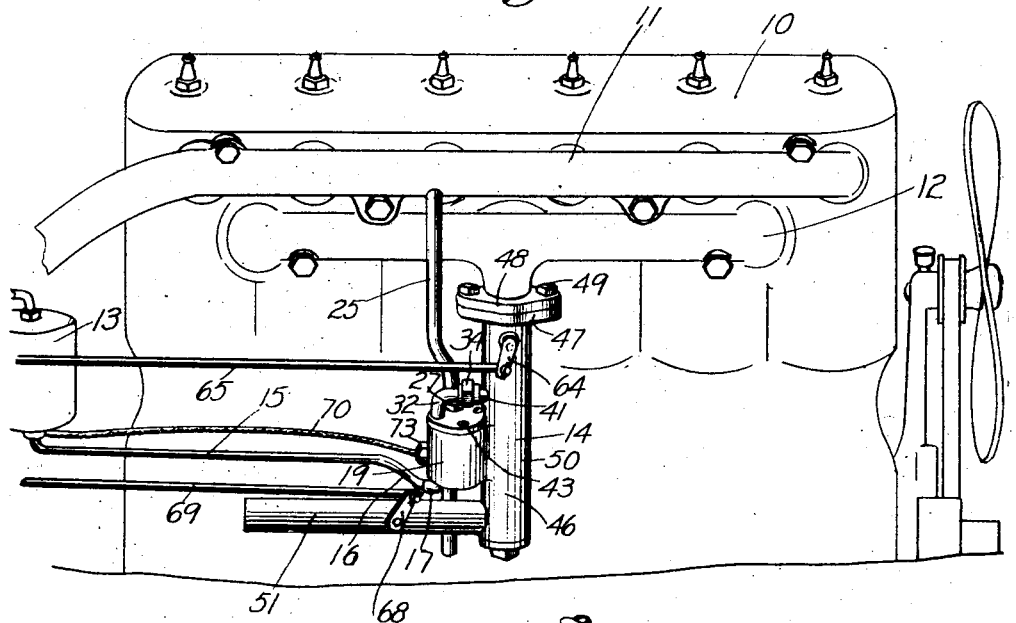
Fig. 1 is a fragmentary side elevational view of an internal combustion engine showing my improved oil vaporizer applied thereto.
Figure 2:
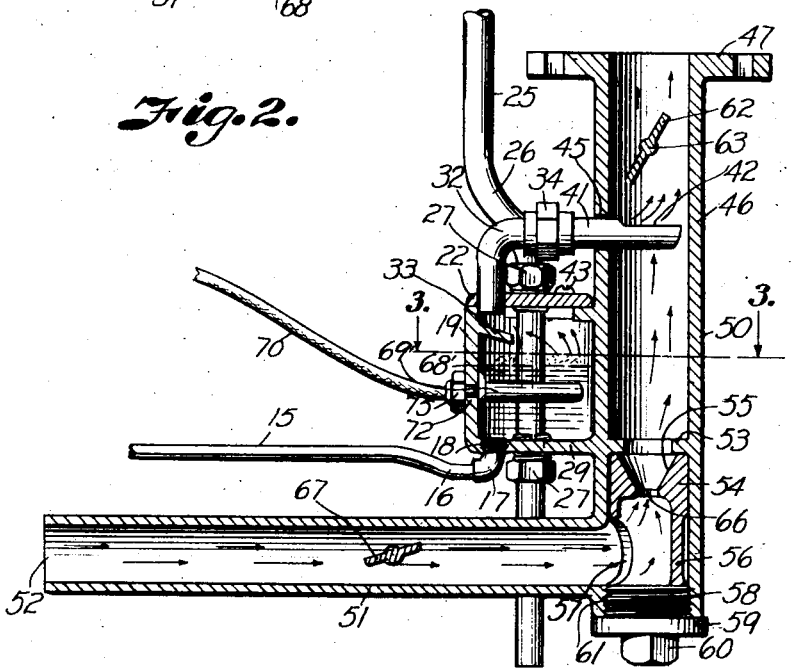
Fig. 2 is a fragmentary vertical sectional view thereof, taken at right angles to Fig. 3.

Referring in detail to the drawings:

My improved oil vaporizer is shown as being applied to an internal combustion engine 10 which has the exhaust manifold 11 and the intake manifold 12, and which is provided with the usual vacuum tank 13 for supplying liquid fuel to the engine. Leading from the vacuum tank 13 to the oil vaporizer 14 is a liquid fuel supply tube 15, said tube being provided with an offset end portion 16 having a connecting member such as an elbow 17 threaded into a screw-threaded opening 18 in the liquid receptacle 19 forming part of the oil vaporizer 14. Said liquid receptacle is further provided with a screw-threaded opening 20 in the bottom thereof and with a flange 21 on the upper end thereof with which the cover plate 22 engages. Said cover plate 22 is provided with a threaded opening 23 that aligns with the cut away portion 24 in the flange 21 and with the threaded opening 20. A tubular member 25 extends from the exhaust manifold 11 through the openings 23 and 20, said tube being offset as indicated at 26. Mounted in the threaded openings 20 and 23 are the bushings 27 which are slotted as at 28 and externally threaded as indicated at 29. When the bushings engage with the threads in the openings 20 and 23, the same will provide a tight joint between the pipe 26 and the bottom 29 and cover plate 22 of the receptacle 19.

The receptacle 19 is further provided with an opening 30 in the flange 21 which aligns with the opening 31 in the cover plate 22 and through which the vapor feeding conduit 32 extends. An inclined partition 33 extends outwardly from the side wall portion of the receptacle 19 below the opening in the end of the conduit 32, thus acting as an inclined baffle member to prevent the drawing of the liquid fuel up through the tube 32 by suction. Screw-threadedly engaging the tube 32 is the nozzle member 34 which has the internally threaded end portion 35 engaging with the tubular member 32 and an internally threaded end portion 36. The central portion of the nozzle 36 is provided with an inwardly directed annular rib portion 37 which has a substantially perpendicular wall portion 38 and a conical wall portion 39 leading from the reduced opening 40 therein toward the threaded end 36 thereof. Screw-threadedly engaging with the internally threaded end 36 of the member 34 is the tubular member 41 which is cut away as at 42 adjacent the end thereof to thus provide a lateral opening therein as well as an opening in the end thereof. The cover plate 22 is screwed in position in any suitable manner as by means of the screws 43 passing through the openings 44 in the member 22. The tubular member 41 extends through an opening 45 in the side wall portion of the inlet tube 46, said inlet tube having a flange 47 which is adapted to be connected with a flange 48 on the intake manifold by means of the bolts 49, so as to provide a gas-tight connection between the intake manifold 12 and the intake tube 46.

The intake tube 46 is provided with a vertically extending portion 50 and a horizontally extending portion 51, said portions being of substantially uniform diameter and the portion 51 being open at the end 52 thereof remote from the vertically extending portion 50. An abutment 53 in the form of a flange or lip extending inwardly from the vertically extending portion 50 is provided in the inlet connection, against which the upper end portion of the plug 54 is adapted to seat, said plug having a thickened upper end portion providing the flaring passage 55 therein and being provided with a tubular central portion 56 having an opening 57 in the side thereof and being further provided with an externally threaded portion 58 between said tubular portion 56 and the flange 59 provided at the lower end thereof. The lower end of the plug 54 is provided with a downwardly extending projection 60 which is preferably polygonal in form so that the same may be engaged by a wrench for turning the same. The intake tube is provided with an internally threaded opening 61 at the junction of the vertically extending portion 50 and the horizontally extending portion 51 thereof, the threaded portion 58 engaging with the threaded portion 61 when the plug 54 is in position. By the provision of the plug 54 a Venturi nozzle is provided in the air inlet connection, and by the provision of the nozzle 34 a Venturi nozzle is provided in the vapor conduit.

A valve member 62 is mounted in the vertically extending portion 50 of the member 46 to pivot around the central portion 63 thereof and is provided with a lever 64 actuated by means of the rod 65 for controlling the position of the valve 62 to thus control the effective opening through the passage 50, thus regulating the supply of explosive mixture supplied to the engine 10 through the intake manifold 12. The valve 62, it will be noted, is located between the point where the tubular member 41 enters the tubular member 50 and the intake manifold. Thus the position thereof has no effect on the relative amount of vaporized fuel and air in the explosive mixture, this being determined by the relative size of the opening 40 and the opening 66 in the plug 54, and as these openings do not vary, the relative proportion of vapor and air in the mixture is substantially constant. The opening provided between the cut away portion 42 in the member 41 faces toward the intake manifold end of the member 46. Thus the stream of oil vapor passing out through the opening 42 is directed toward the intake manifold. The tubular member 51 is preferably provided with a valve 67 serving to choke off the supply of air when this is desired, movement of the valve 67 being accomplished by the lever 68 actuated by the rod 69.

The heated exhaust gases passing through the tube 25 will ordinarily vaporize the liquid fuel 68' contained in the receptacle 19 when the engine is running, but in starting the engine and in providing vaporized fuel prior to starting the engine, it is also necessary to heat the liquid fuel 68', and in order to do this an electric heating device 69' is mounted in the receptacle 19 below the level of the liquid fuel 68' therein, electric current being supplied thereto to heat the same by means of the conductor 70. The member 69' is secured in liquid-tight engagement with the wall of the receptacle 19 where the same passes through the openings 17 by means of the washer or gasket 72 on the member 69' which is drawn tight against the wall of the receptacle 19 by means of the nut 73 screw-threadedly engaging with the reduced screw-threaded end 74 on the member 69', the reduced end portion 74 providing a shoulder 75 against which the gasket 72 will seat.

What I claim and desire to secure by Letters Patent is:—

1. In an oil vaporizer, an oil container having a baffle plate at its upper end, a tube extending through the container for conducting heat therethrough to vaporize the oil, a mixing chamber exterior to said container for connection to a manifold and having one end open to atmospheric air, a removable Venturi fitting controlling admission of air into the mixing chamber, a conduit for oil vapor produced in said container leading from above the baffle plate in the container and into said mixing chamber, and a coupling in said conduit having a Venturi port controlling flow of vaporized oil.

2. In an oil vaporizer, an oil container having a baffle plate at its upper end, a tube extending through the container for conducting heat therethrough to vaporize the oil, a mixing chamber exterior to said container for connection to a manifold and having an inner annular flange forming a seat, an angularly disposed tubular member communicating with said chamber, a Venturi fitting in the chamber and engaging said seat, a conduit for oil vapor produced in said container leading from above said baffle plate in the container into said mixing chamber, and a coupling in said conduit having a Venturi opening controlling flow of vaporized oil from the container to the mixing chamber.

In testimony whereof I affix my signature.

ARTHUR C. SWEENY.